United States Patent

[11] 3,540,684

| [72] | Inventor | Stephen L. Snyder |
| | | 331 Cherry Hill Blvd., Cherry Hill, New Jersey 08034 |
| [21] | Appl. No. | 798,420 |
| [22] | Filed | Feb. 11, 1969 |
| [45] | Patented | Nov. 17, 1970 |

[54] PILOT CHUTE CONTROLLED INFLATION SYSTEM FOR PARACHUTES
17 Claims, 9 Drawing Figs.

[52] U.S. Cl. .................................................. 244/149
[51] Int. Cl. .................................................. B64d 17/64
[50] Field of Search ........................................ 244/138, 142, 145, 147, 149, 150

[56] References Cited
UNITED STATES PATENTS

| 2,028,777 | 1/1936 | Hoffman | 244/149 |
| 2,358,417 | 9/1944 | Quilter et al. | 144/142 |
| 2,634,068 | 4/1953 | Frieder et al. | 244/145 |
| 3,301,511 | 1/1967 | Webb | 244/138 |

Primary Examiner—Milton Buchler
Assistant Examiner—James E. Pittenger
Attorney—Clarence A. O'Brien and Harvey B. Jacobson ABSTRACT: The drag of a pilot chute initiates inflation of a canopy to which it is connected by at least one continuous reefing line having a timed length to regulate dereefing and opening of the canopy. The drag force of the pilot chute is distributed in a stabilizing surface to the canopy at spaced locations by guide rings through which the reefing line extends. The decreasing influence of the pilot chute during descent may be abruptly removed upon full inflation of the canopy by inversion of a canopy storing bag over the pilot chute.

Patented Nov. 17, 1970     3,540,684
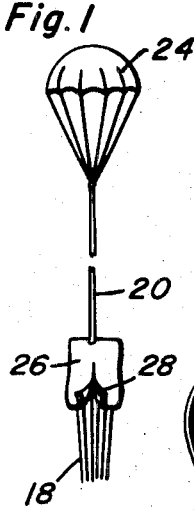
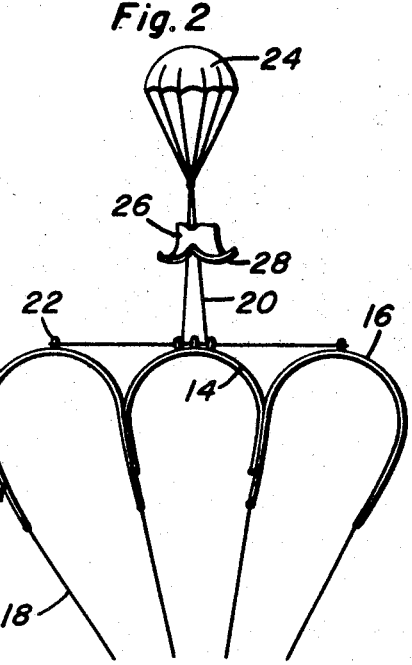
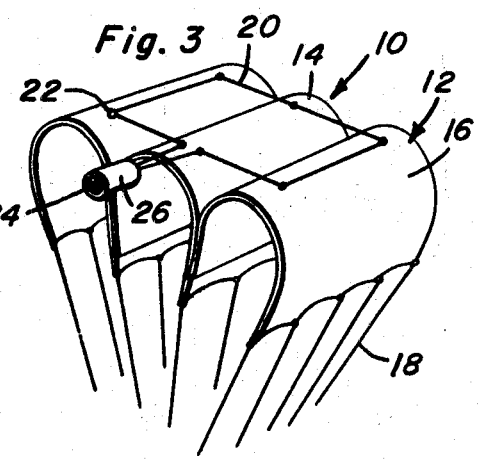
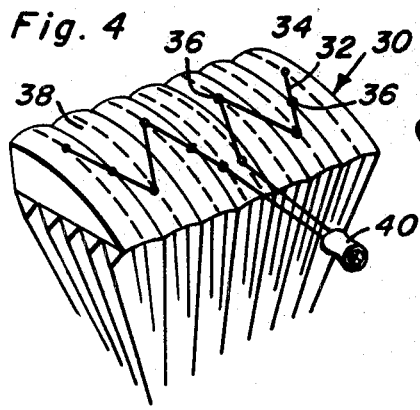
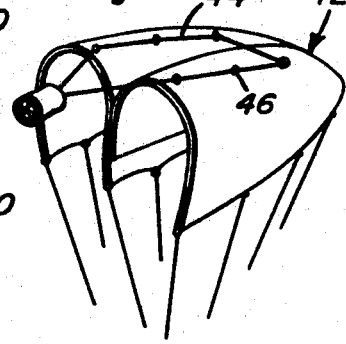
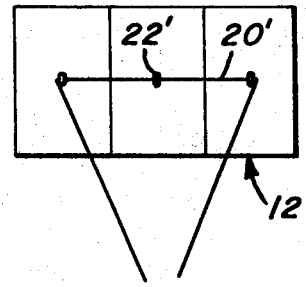
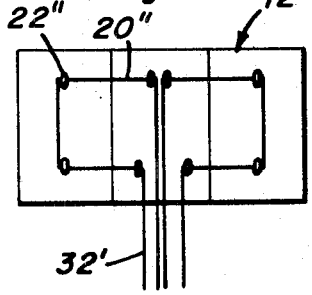
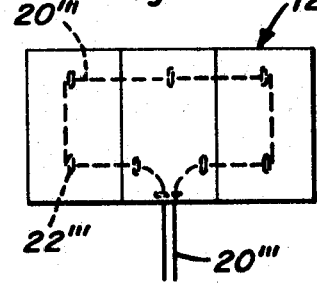
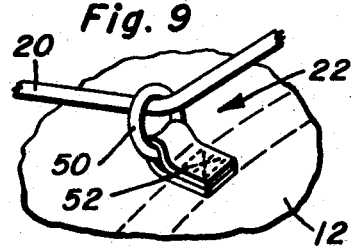
Stephen L. Snyder
INVENTOR.

PILOT CHUTE CONTROLLED INFLATION SYSTEM FOR PARACHUTES

This invention relates to reefing controls for parachutes.

Various reefing control arrangements have been devised to regulate inflation and opening of a parachute canopy during descent in an effort to reduce opening shock imposed on the load suspended from the parachute canopy. Toward this end, opening or inflation of the parachute canopy is restricted or retarded by means of reefing lines that are controllably released often under control of a complex and expensive timing mechanism. In one type of reefing system, as disclosed in U.S. Pat. No. 2,980,371 to Finney, a plurality of reefing lines are tensioned during deployment of the parachute by the drag of a pilot chute to which the reefing lines are connected. The reefing lines as disclosed in the latter patent are confined to individual gores of a symmetrical type canopy and are anchored to it at its peripheral skirt. This type of reefing control is limited to a specific type of parachute canopy and is of little value in stabilizing the opening of the parachute and cannot accommodate different timing requirements.

An important object of the present invention therefore is to provide a pilot chute controlled reefing system applicable to different types of parachute canopies such as sail wings, parafoils and parawings.

A further object is to provide a reefing control system which will improve the reliability of the parachute opening especially for nonsymmetrical types of parachutes that are inherently less reliable in opening due to asymmetrical aerodynamic loading during inflation. Other objects of the invention include the provision of a parachute reefing control system having a timing capability and capable of simplifying the packing of the parachute canopy.

In accordance with the present invention, at least one continuous reefing line interconnects a pilot chute with the canopy of the parachute. The reefing line extends through a plurality of guide rings secured to the canopy material at a plurality of spaced locations covering a substantial surface area of the canopy. In this fashion, the drag force of the parachute is distributed at said locations on the canopy forming a stabilizing surface from which the reefing line extends by a decreasing amount to the pilot chute during descent and deployment of the parachute. This distribution of the drag force by the reefing line not only prevents abrupt inflation of the canopy to inhibit opening shock but also prevents diving and tucking under of portions of the canopy so as to make opening of the parachute more reliable. The arrangement of the reefing line is such as to prevent fouling, avoid formation of openings in the canopy and may also be useful in packing the canopy in the parachute pack without folding if desired. Further, the pilot chute may be rendered ineffective by timely collapse thereof within a canopy storing bag ejected from the canopy as it begins inflation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view of a portion of a parachute assembly during an initial stage of deployment, in accordance with the present invention.

FIG. 2 is a side elevational view of the parachute assembly during an intermediate stage of deployment.

FIG. 3 is a perspective view of the parachute assembly as fully deployed.

FIG. 4 is a perspective view of a different type of parachute assembly fully deployed in accordance with the present invention.

FIG. 5 is a perspective view of yet another type of parachute assembly fully deployed in accordance with the present invention.

FIG. 6 is a simplified top plan view of a fully deployed parachute assembly of the type illustrated in FIGS. 2 and 3 with a modified form of reefing control arrangement.

FIG. 7 is a top plan view similar to FIG. 6 showing yet another reefing control arrangement.

FIG. 8 is a top plan view similar to FIG. 6 showing a still further reefing control arrangement.

FIG. 9 is an enlarged perspective view showing a detail of the reefing control arrangement.

Referring now to the drawings in detail, and initially to FIG. 3, a parachute arrangement is shown generally denoted by reference numeral 10. This parachute assembly includes a flexible canopy 12 of the sail wing type having a center lobe 14 and outer lobes 16 on either side thereof. Suspension lines 18 extend from the lower edges of the inflated canopy to the load (not shown) whether it be inanimate load or a human being. In the embodiment illustrated in FIG. 3, it will be noted that a single continuous reefing line 20 extends through a plurality of guide or attachment elements 22 secured to the top surface of the canopy at spaced locations. The points at which the guide elements are secured to the inflated canopy define a stabilizing surface from which the reefing line extends away from the canopy. It will also be noted, that each of the lobes of the canopy has guide elements secured thereto so that the spacing between the guide elements on the respective lobes increases as the canopy is inflating, to thereby correspondingly reduce the distance that the reefing line extends from the stabilizing surface.

As shown in FIGS. 1 and 2, the reefing line 20 extends to and is connected at its opposite ends to a pilot drag chute 24. The pilot chute is initially released from the parachute pack on a free falling load when the rip cord is pulled. The bridle stows pulled out by the pilot chute release the canopy enclosing bag 26 as shown in FIG. 1 from which the suspension lines 18 pay off to release the flaps 28 of the bag exposing the canopy stored therewithin. Inflation of the canopy is then begun occasioned by the upward ejection of the bag over the bridle stow portions of the reefing line 20 which extend to the pilot chute. Thus, as the inflating canopy expands to increase the spacing between the guide elements 22 on the respective lobes of the canopy, the pilot chute is drawn toward the top surface of the inflating canopy to meet the upwardly moving bag 26 as shown in FIG. 2. When the canopy is fully inflated, the bag 26 engages the pilot chute and is inverted thereover to collapse and enclose the same as shown in FIG. 3. Thus, the upward drag influence of the pilot chute is automatically and substantially removed upon full inflation of the canopy causing the pilot chute to drop to the side of the canopy as shown in FIG. 3.

After the pilot chute is deployed, its drag force tensions the reefing line 20 by an amount dependent upon its drag coefficient at the particular velocity of the system. The tensile strength of the reefing line must therefore exceed the maximum drag force exerted by the pilot chute in order to achieve the stated objectives of the invention. A higher system velocity thus results in correspondingly higher opening forces and inflation rate for the canopy to produce a higher drag force on the pilot chute and a higher tension in the reefing line 20 tending to reduce the inflation rate corresponding to the higher opening forces. This effect of the reefing line tension results from the inwardly directed force components exerted on the canopy by the reefing line at the guide elements. These inwardly directed force components tend to reduce the normal rate at which the effective canopy surface area would ordinarily increase at a given system velocity. As the overall system velocity decreases due to progressive expansion of the effective canopy surface area, the pilot chute drag and reefing line tension also decrease thereby precisely regulating the rate at which inflation continues until full opening is achieved.

The arrangement of the guide elements 22 through which the reefing line extends, is not only operative to resist inflation of the canopy so as to inhibit opening shock but will also distribute the drag force upwardly over a substantial surface area of the canopy from a stabilizing surface as aforementioned in order to improve opening reliability. For example, during deployment and descent of the parachute, the inertial downward rush of the air following the deploying canopy as it decelerates to a low final velocity, causes momentary deflections of the canopy from its fully inflated shape. This phenomenon sometimes causes tucking under of the canopy at corners and diving of portions thereof resulting in parachute malfunction. The distribution of the pilot chute drag force in the stabilizing surface at the spaced locations on the canopy prevents this type of opening instability because of the arrangement of forces relative to the stabilizing surface, said forces originating from the payload, the pilot chute and aerodynamic effects.

It will be furthermore apparent, that because of the continuity of the reefing line and its guided connection to the canopy on the same side from which the reefing line extends to the pilot chute, there is little likelihood of fouling of the canopy by the reefing line so as to detract from its opening reliability as in the case of prior art arrangements. Because the pilot chute is initially spaced a substantial distance from the canopy during deployment, it will not be subject to an aerodynamic blanketing effect as the canopy begins inflation. This blanketing effect would normally overcome the pilot chute and eliminate its drag influence if it were relatively close to the top of the canopy as in the case of prior arrangements where there is very little change in the length of the lines extending between the pilot chute and the canopy during inflation. Also, the length of the reefing line will determine the time during which the drag force influence of the pilot chute is exerted on the inflating canopy. Accordingly, the system of the present invention may be tailored by varying pilot chute size and reefing line length to meet any desired timing and inflation control requirements.

Another advantage of the reefing control arrangement of the present invention, resides in the possible simplification of parachute packing which normally involves careful and tedious folding of the canopy. Thus, canopy folding may be avoided by merely drawing up on the reefing line thereby collapsing the canopy into a small compact shape for storing within the bag 26.

The reefing control principles of the present invention as described in connection with the sail wing type of parachute illustrated in FIG. 3, is also applicable to other types of parachute canopies such as the parafoil canopy 30 illustrated in FIG. 4. While a single continuous reefing line may be mounted on the top surface of the canopy 30 in a rectangular arrangement as illustrated in FIG. 3, FIG. 4 shows two continuous reefing lines 32 arranged on the top surface of the canopy. The reefing lines 32 are symmetrically arranged on the top surface of the canopy 30. Opposite ends of each reefing line 32 are respectively connected to the pilot chute and an anchor point 34 on the canopy. Thus, the reefing lines 32 extend from the anchor points through guide elements 36 secured to sections 38 in spaced relation to each other. A canopy storing bag 40 is also shown in FIG. 4 enclosing the collapsed pilot chute to which the reefing lines 32 are connected. Thus, the arrangement illustrated in FIG. 4 is similar in operation to that described in connection with FIGS. 1, 2 and 3.

FIG. 5 illustrates another type of parachute to which the reefing control arrangement may be applied such as a parachute having a parawing canopy 42. The single continuous reefing line 44 shown in FIG. 5 extends across both lobes of the canopy through the guide elements 46, with opposite ends of the reefing line being connected to the pilot chute enclosed within the canopy storing bag 48 dropping rearwardly of the canopy once it is fully inflated.

It will be appreciated, that the arrangement of guide elements through which the reefing line or lines extend over a substantial surface area of the canopy, may take various geometrical shapes and forms. Thus, as shown in FIG. 6, the reefing line 20' is guided across the lobes of a sail wing canopy 12 in a single file arrangement of guide elements 22' with opposite ends of the reefing line being connected to the pilot chute. In FIG. 7, two reefing lines 32' are utilized and arranged symmetrically in a rectangular pattern by the guide elements 22'' with both ends of each reefing line being connected to the pilot chute. In FIG. 8, the reefing line 20''' is arranged in a rectangular pattern similar to that illustrated in FIG. 3 by means of guide elements 22'''' below the canopy.

The guide elements for the reefing line may be of any suitable type or construction such as the guide rings 50 associated with the guide elements 22 as shown in FIG. 9. The guide rings 50 may be anchored by means of fabric straps 52 sewn to the canopy as shown.

I claim:

1. In combination with a parachute having a canopy and a pilot chute exerting a drag force on the canopy during inflation thereof, means for regulating inflation of the canopy to an open condition comprising guide means connected to the canopy at a plurality of locations for distribution of said drag force during inflation, reefing means threaded through said guide means at said locations to provide the sole connection between said canopy and the pilot chute, said reefing means being in a tensioned condition during inflation to form stabilizing means interconnecting the pilot chute and the canopy for maintaining the reefing means in said tensioned condition until the canopy is inflated to said open position.

2. The combination of claim 1 wherein said guide means comprises attachment elements secured to the canopy at said locations, said reefing means including at least one reefing line having a tensile strength exceeding the maximum drag force exerted by the pilot chute.

3. The combination of claim 2 wherein said canopy includes a plurality of lobe portions, each of the lobe portions having at least one of the attachment elements secured thereto.

4. The combination of claim 2 wherein said reefing line forms a loop.

5. The combination of claim 4 wherein said canopy includes a plurality of lobe portions, each of the lobe portions having at least one of the attachment elements secured thereto.

6. The combination of claim 5 including means for collapsing the pilot chute following complete inflation of the canopy.

7. The combination of claim 6 wherein said pilot chute collapsing means comprises a canopy storing bag movable along the reefing line between the canopy and the pilot chute, said bag being inverted over the pilot chute when engaged therewith to enclose the same.

8. The combination of claim 1 wherein the reefing means includes at least two reefing lines threaded through said guide means, each of said reefing lines having opposite ends respectively anchored to the canopy and the pilot chute.

9. The combination of claim 1 wherein said stabilizing means includes means for connecting opposite ends of the reefing means to the pilot chute.

10. The combination of claim 1 including means for collapsing the pilot chute following complete inflation of the canopy.

11. The combination of claim 10 wherein said pilot chute collapsing means comprises a canopy storing bag movable along the reefing line between the canopy and the pilot chute, said bag being inverted over the pilot chute when engaged therewith to enclose the same.

12. In combination with a parachute or the like having a flexible canopy from which suspension lines extend and a pilot chute which is initially inflated during deployment of the parachute, means for controlling inflation of the canopy comprising flexible reefing means connecting the canopy to the pilot chute for restricting inflation of the canopy in response to drag of the pilot chute, attachment means through which the reefing means is threaded for distributing the drag of said pilot chute at a plurality of spaced locations on the canopy from which the reefing means extends to the pilot chute, and means connecting the pilot chute to the canopy only by the reefing means through the attachment means for continuously tensioning the reefing means in response to said drag of the pilot chute while the canopy is being inflated.

13. The combination of claim 12 wherein said canopy in an inflated condition has an external surface curvature fixed to said stabilizing surface at said spaced locations.

14. The combination of claim 13 wherein said reefing means includes at least one continuous line having a predetermined timing length.

15. The combination of claim 14 wherein said attachment means includes a plurality of guide elements secured to the canopy at said locations through which the continuous line extends.

16. The combination of claim 12 wherein said attachment means includes a plurality of guide elements secured to the canopy at said locations through which the reefing means extends.

17. The combination of claim 12 including means for collapsing the pilot chute following complete inflation of the canopy.